US 008473850 B2

(12) United States Patent
Liang et al.

(10) Patent No.: US 8,473,850 B2
(45) Date of Patent: Jun. 25, 2013

(54) METHODS AND APPARATUSES FOR DISPLAYING AND MANAGING CONTENT DURING A COLLABORATION SESSION

(75) Inventors: Neil Liang, Mountain View, CA (US); Chengli Wu, Fremont, CA (US); Elaine Montgomery, Redwood City, CA (US)

(73) Assignee: Cisco Technology, Inc., San Jose, CA (US)

( * ) Notice: Subject to any disclaimer, the term of this patent is extended or adjusted under 35 U.S.C. 154(b) by 746 days.

(21) Appl. No.: 11/753,178

(22) Filed: May 24, 2007

(65) Prior Publication Data

US 2008/0294992 A1 Nov. 27, 2008

(51) Int. Cl.
*G06F 3/048* (2006.01)
(52) U.S. Cl.
USPC .......... 715/751; 715/781; 715/777; 715/753; 715/802; 709/204
(58) Field of Classification Search
USPC .......................... 715/733, 751, 761, 781, 777
See application file for complete search history.

(56) References Cited

U.S. PATENT DOCUMENTS

| | | | |
|---|---|---|---|
| 5,062,060 A | 10/1991 | Kolnick | |
| 5,491,795 A | 2/1996 | Beaudet et al. | |
| 5,577,188 A | 11/1996 | Zhu | |
| 5,623,603 A | 4/1997 | Jiang et al. | |
| 5,684,969 A * | 11/1997 | Ishida | 715/800 |
| 5,758,110 A | 5/1998 | Boss et al. | |
| 5,760,769 A * | 6/1998 | Petrie | 715/759 |
| 5,874,960 A * | 2/1999 | Mairs et al. | 715/733 |
| 5,944,791 A | 8/1999 | Scherpbier | |
| 5,999,177 A * | 12/1999 | Martinez | 715/784 |
| 6,167,432 A | 12/2000 | Jiang | |
| 6,271,839 B1 * | 8/2001 | Mairs et al. | 715/807 |
| 6,308,199 B1 | 10/2001 | Katsurabayashi | |
| 6,329,984 B1 | 12/2001 | Boss et al. | |
| 6,489,975 B1 | 12/2002 | Patil et al. | |
| 6,567,813 B1 | 5/2003 | Zhu et al. | |
| 6,570,590 B1 * | 5/2003 | Dubrow et al. | 715/751 |
| 6,601,087 B1 | 7/2003 | Zhu et al. | |
| 6,654,032 B1 | 11/2003 | Zhu et al. | |
| 6,664,983 B2 * | 12/2003 | Ludolph | 715/775 |
| 6,691,154 B1 | 2/2004 | Zhu et al. | |
| 6,729,885 B2 * | 5/2004 | Stuppy et al. | 434/322 |
| 6,763,501 B1 | 7/2004 | Zhu et al. | |
| 6,789,119 B1 | 9/2004 | Zhu et al. | |
| 6,901,448 B2 | 5/2005 | Zhu et al. | |
| 6,925,645 B2 | 8/2005 | Zhu et al. | |
| 7,069,298 B2 | 6/2006 | Zhu et al. | |
| 7,181,698 B2 * | 2/2007 | Shahrbabaki et al. | 715/790 |
| 7,293,243 B1 * | 11/2007 | Ben-Shachar et al. | 715/781 |

(Continued)

OTHER PUBLICATIONS

PCT Notification of Transmittal of the International Search Report and the Written Opinion of the International Searching Authority, or the Declaration, International Application No. PCT/US2008/006620, International Filing Date: May 23, 2008, Date of document mailing: Oct. 24, 2008, 12 pages.

(Continued)

*Primary Examiner* — Daeho Song

(57) ABSTRACT

Methods and apparatuses share shared content from a presenter device with an attendee device; display the shared content on the attendee device; display an indicator associated with the shared content on the presenter device; and display a control tab configured to change a shared status.

21 Claims, 9 Drawing Sheets

U.S. PATENT DOCUMENTS

| | | | |
|---|---|---|---|
| 7,418,664 B2 | 8/2008 | Ben-Shachar et al. | |
| 7,426,697 B2 * | 9/2008 | Holecek et al. | 715/788 |
| 7,568,005 B2 * | 7/2009 | Nichols et al. | 709/204 |
| 7,595,798 B2 * | 9/2009 | Ben-Shachar et al. | 345/418 |
| 7,599,989 B2 * | 10/2009 | Stevens et al. | 709/204 |
| 7,607,092 B2 * | 10/2009 | Rogers et al. | 715/734 |
| 2002/0194272 A1 | 12/2002 | Zhu | |
| 2003/0164853 A1 | 9/2003 | Zhu et al. | |
| 2003/0167301 A1 | 9/2003 | Zhu et al. | |
| 2003/0167302 A1 | 9/2003 | Zhu et al. | |
| 2003/0167304 A1 | 9/2003 | Zhu et al. | |
| 2003/0167339 A1 | 9/2003 | Zhu et al. | |
| 2003/0167418 A1 | 9/2003 | Zhu et al. | |
| 2003/0182375 A1 * | 9/2003 | Zhu et al. | 709/205 |
| 2003/0206189 A1 | 11/2003 | DeMello et al. | |
| 2005/0060656 A1 * | 3/2005 | Martinez et al. | 715/751 |
| 2005/0132299 A1 * | 6/2005 | Jones et al. | 715/759 |
| 2005/0165859 A1 | 7/2005 | Geyer et al. | |
| 2006/0002315 A1 * | 1/2006 | Theurer et al. | 370/261 |
| 2006/0148512 A1 * | 7/2006 | Ekholm et al. | 455/550.1 |
| 2006/0161623 A1 | 7/2006 | Montgomery et al. | |
| 2006/0190826 A1 | 8/2006 | Montgomery et al. | |
| 2006/0277482 A1 * | 12/2006 | Hoffman et al. | 715/764 |
| 2007/0156689 A1 * | 7/2007 | Meek et al. | 707/8 |
| 2007/0263082 A1 * | 11/2007 | Tamaru et al. | 348/14.08 |
| 2007/0266104 A1 * | 11/2007 | Bolf et al. | 709/206 |
| 2007/0277110 A1 * | 11/2007 | Rogers et al. | 715/736 |

OTHER PUBLICATIONS

PCT Notification of Transmittal of the International Search Report and the Written Opinion of the International Searching Authority, or the Declaration, International Application No. PCT/US06/62748, International Filing Date: Dec. 29, 2006, Date of Document mailing: Dec. 9, 2008, 9 pages.

U.S. Appl. No. 11/805,764 entitled Methods and apparatuses for selectively removing sensitive information during a collaboration session, filed May 23, 2007 by Defeng Lu, 42 pages.

* cited by examiner

METHODS AND APPARATUSES FOR DISPLAYING AND MANAGING CONTENT DURING A COLLABORATION SESSION

FIELD OF INVENTION

The present invention relates generally to displaying and managing content and, more particularly, to displaying and managing content during a collaboration session.

BACKGROUND

There has been an increased use in collaboration sessions that are Internet or web-based to communicate with employees, vendors, and clients. During these collaboration sessions, information is typically exchanged between multiple participants. This exchanged information may include audio, graphical, and/or textual information. For simplicity, it is sometimes is desirable to conduct a collaboration session by sharing the presenter's entire desktop.

SUMMARY

Methods and apparatuses share shared content from a presenter device with an attendee device; display the shared content on the attendee device; display an indicator associated with the shared content on the presenter device; and display a control tab configured to change a shared status.

BRIEF DESCRIPTION OF THE DRAWINGS

The accompanying drawings, which are incorporated in and constitute a part of this specification, illustrate and explain one embodiment of the methods and apparatuses for displaying and managing content during a collaboration session. In the drawings.

DETAILED DESCRIPTION

The following detailed description of the methods and apparatuses for displaying and managing content during a collaboration session refers to the accompanying drawings. The detailed description is not intended to limit the methods and apparatuses for displaying and managing content during a collaboration session. Instead, the scope of the methods and apparatuses for displaying and managing content during a collaboration session is defined by the appended claims and equivalents. Those skilled in the art will recognize that many other implementations are possible, consistent with the present invention.

References to a device include a device utilized by a user such as a desktop computer, a portable computer, a personal digital assistant, a video phone, a landline telephone, a cellular telephone, and a device capable of receiving/transmitting an electronic signal.

References to content include audio, video, graphical, and/or textual data.

References to a window are directed to an area utilized to display the content.

References to a desktop are directed to an entire portion of a display area of a corresponding device.

References to a collaboration session include a plurality of devices that are configured to view content submitted by one of the devices.

References to a participant device include devices that are participating in the collaboration session.

References to a presenter device include a device that is participant and shares content shared with other participants.

References to an attendee device include a device that is a participant and receives content shared by another participant device. The attendees are capable of view content that is offered by the presenter device. In some instances, the attendee devices are capable of modifying the content shared by the presenter device.

Figure 1:
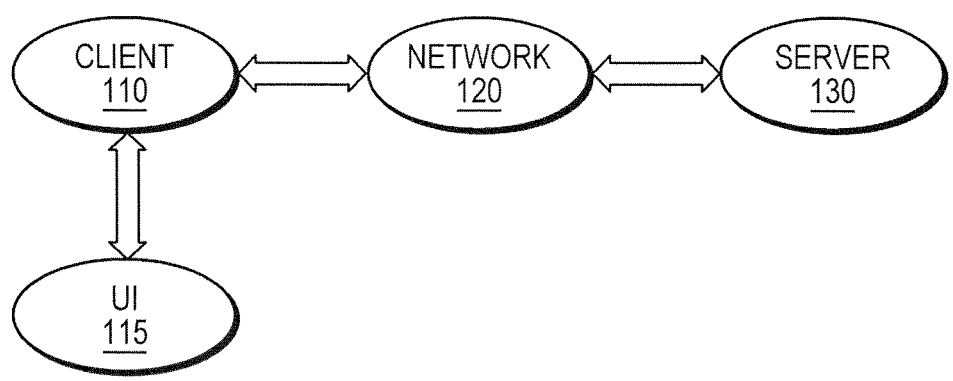
FIG. 1 is a diagram illustrating an environment within which the methods and apparatuses for displaying and managing content during a collaboration session are implemented.

FIG. 1 is a diagram illustrating an environment within which the methods and apparatuses for displaying and managing content during a collaboration session are implemented. The environment includes an electronic device 110 (e.g., a computing platform configured to act as a client device, such as a computer, a personal digital assistant, and the like), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., a keypad, a video display screen, input and output interfaces etc., in the same housing such as a personal digital assistant). In other embodiments, one or more user interface 115 components (e.g., a keyboard, a pointing device such as a mouse, a trackball, etc., a microphone, a speaker, a display, a camera etc.) are physically separate from, and are conventionally coupled to, the electronic device 110. In one embodiment, the user utilizes interface 115 to access and control content and applications stored in electronic device 110, server 130, or a remote storage device (not shown) coupled via network 120.

In accordance with the invention, embodiments of selectively sharing a portion of a display during a collaboration session below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
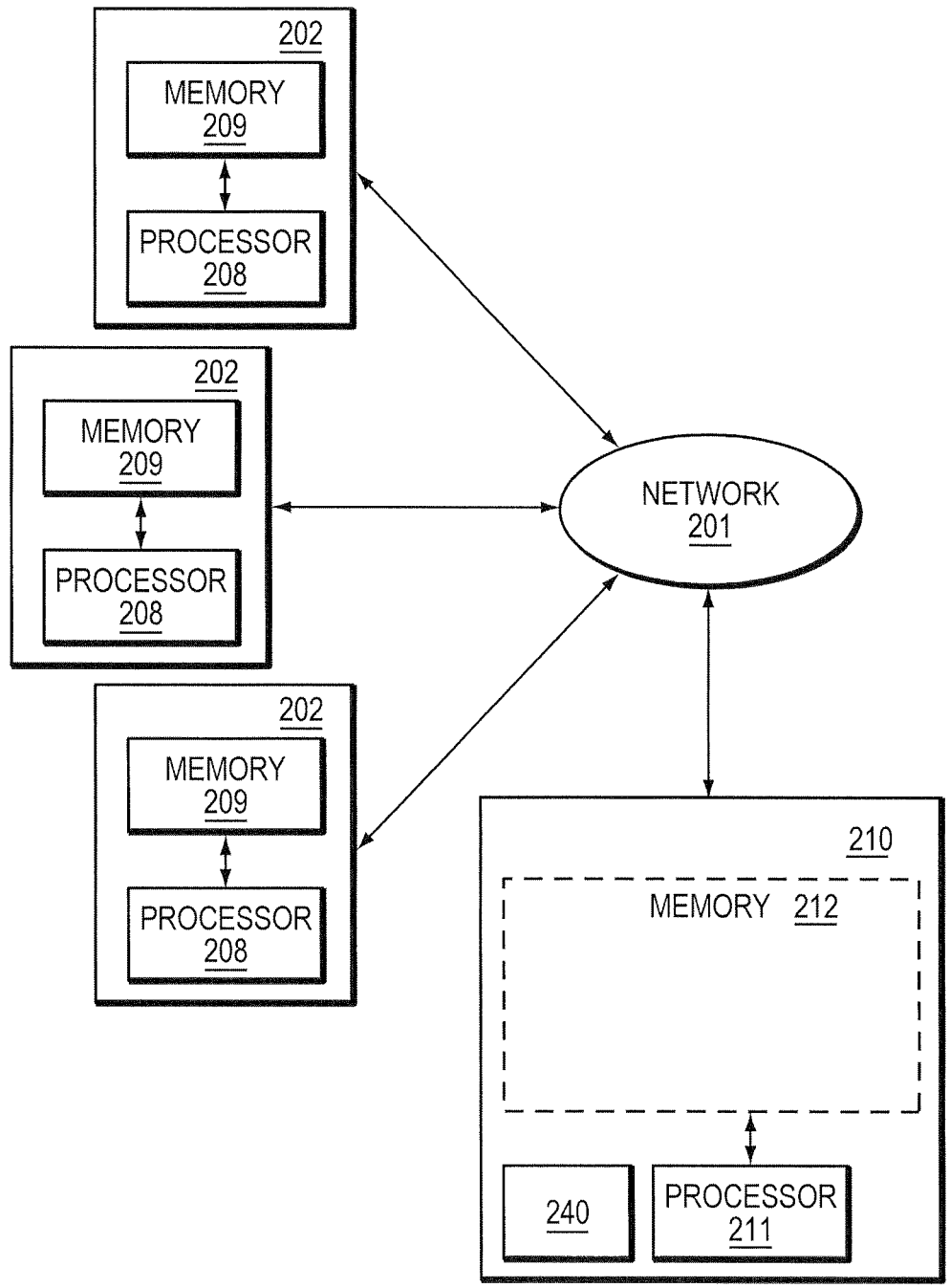
FIG. 2 is a simplified block diagram illustrating one embodiment in which the methods and apparatuses for displaying and managing content during a collaboration session are implemented.

FIG. 2 is a simplified diagram illustrating an exemplary architecture in which the methods and apparatuses for displaying and managing content during a collaboration session are implemented. The exemplary architecture includes a plurality of electronic devices 202, a server device 210, and a network 201 connecting electronic devices 202 to server 210 and each electronic device 202 to each other. The plurality of electronic devices 202 are each configured to include a computer-readable medium 209, such as random access memory, coupled to an electronic processor 208. Processor 208 executes program instructions stored in the computer-readable medium 209. In one embodiment, a unique user operates each electronic device 202 via an interface 115 as described with reference to FIG. 1.

The server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

In one embodiment, the plurality of client devices 202 and the server 210 include instructions for a customized application for displaying and managing content during a collaboration session. In one embodiment, the plurality of computer-readable media 209 and 212 contain, in part, the customized application. Additionally, the plurality of client devices 202 and the server 210 are configured to receive and transmit electronic messages for use with the customized application. Similarly, the network 210 is configured to transmit electronic messages for use with the customized application.

One or more user applications are stored in media 209, in media 212, or a single user application is stored in part in one media 209 and in part in media 212. In one instance, a stored user application, regardless of storage location, is made customizable based on selectively sharing a portion of a display during a collaboration session as determined using embodiments described below.

Figure 3:
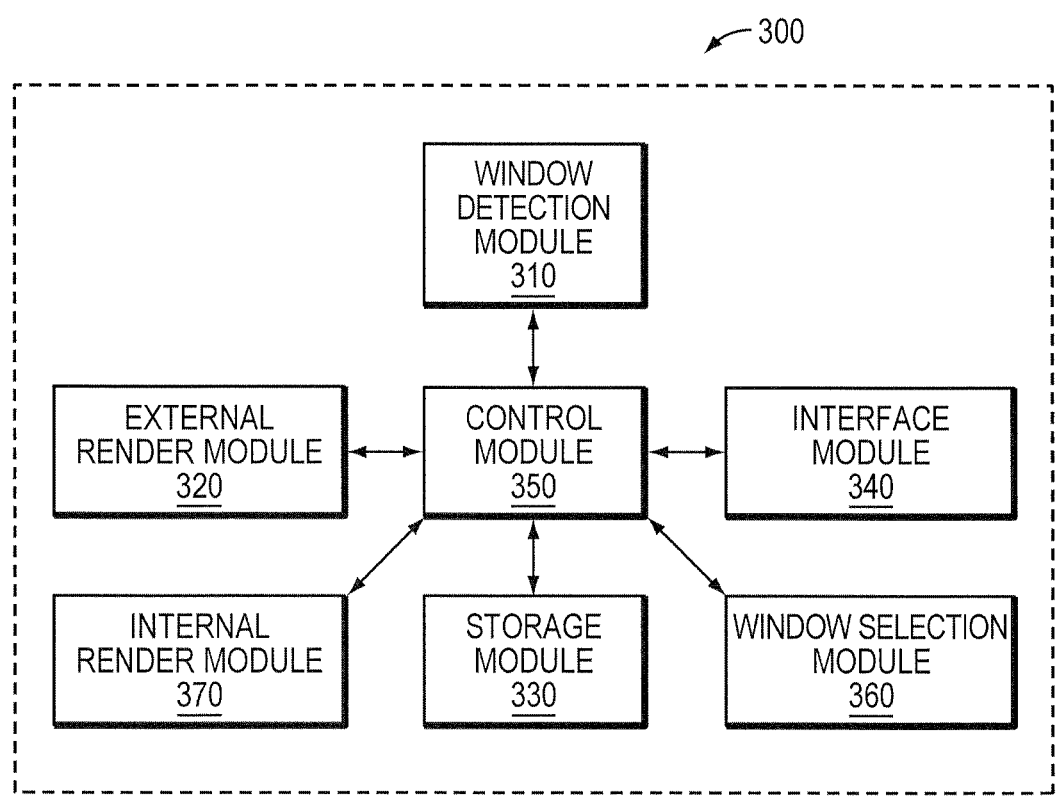
FIG. 3 is a simplified block diagram illustrating a system, consistent with one embodiment of the methods and apparatuses for displaying and managing content during a collaboration session.

FIG. 3 illustrates one embodiment of a system 300. In one embodiment, the system 300 is embodied within the server 130. In another embodiment, the system 300 is embodied within the electronic device 110. In yet another embodiment, the system 300 is embodied within both the electronic device 110 and the server 130.

In one embodiment, the system 300 includes a window detection module 310, an external render module 320, a storage module 330, an interface module 340, a control module 350, a window selection module 360, and an internal render module 370.

In one embodiment, the control module 350 communicates with the window detection module 310, the external render module 320, the storage module 330, the interface module 340, the window selection module 360, and the internal render module 370. In one embodiment, the control module 350 coordinates tasks, requests, and communications between the window detection module 310, the external render module 320, the storage module 330, the interface module 340, the window selection module 360, and the internal render module 370.

In one embodiment, the window detection module 310 detects a window that is utilized by a participant device that is acting as a presenter device. In one embodiment, the window is utilized to view content. In one embodiment, the window is utilized to view content that is part of the collaboration session. In another embodiment, the window is utilized to view confidential information. The window detection module 310 is configured to detect any number of windows utilized to display content within a desktop of the presenter device.

In one embodiment, the external render module 320 renders content for display on participant devices that are attendee devices of the collaboration session.

In one embodiment, the interface detection module 340 detects when the cursor is moved on the device participating in the collaboration session. In another embodiment, the interface detection module 340 monitors the voice transmissions originating from the device participating in the collaboration session. In yet another embodiment, the interface detection module 340 detects any activity by the device participating in the collaboration session.

In one embodiment, the storage module 330 stores a record including a profile associated with the each device participating in a collaboration session. An exemplary profile is shown in a record 400 within FIG. 4.

In one embodiment, the interface module 340 receives a signal from one of the electronic devices 110. In one embodiment, the electronic devices 110 are participating in a collaboration session. In another embodiment, the interface module 340 delivers a signal to one of the electronic devices 110.

In one embodiment, the window selection module 360 selects the windows or content areas that are to be displayed on the presenter device and kept private from the attendee device(s).

In one embodiment, the internal render module 370 renders content for display on the presenter device within the collaboration session.

The system 300 in FIG. 3 is shown for exemplary purposes and is merely one embodiment of the methods and apparatuses for displaying and managing content during a collaboration session. Additional modules may be added to the system 300 without departing from the scope of the methods and apparatuses for displaying and managing content during a collaboration session. Similarly, modules may be combined or deleted without departing from the scope of the methods and apparatuses for displaying and managing content during a collaboration session.

Figure 4:
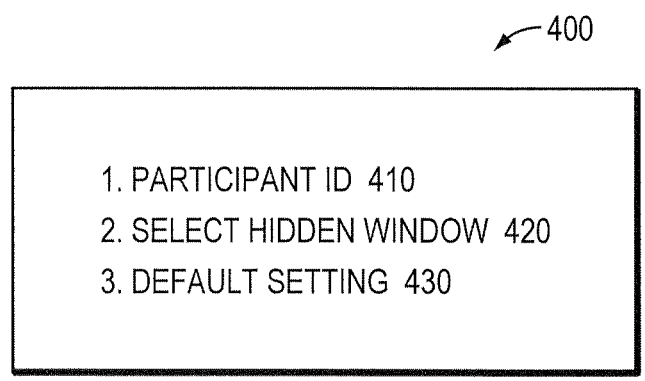
FIG. 4 is an exemplary record for use with the methods and apparatuses for displaying and managing content during a collaboration session.

FIG. 4 illustrates an exemplary record 400 for use with the methods and apparatuses for displaying and managing content during a collaboration session. In one embodiment, the record 400 illustrates an exemplary record associated with the profile information of a particular participant device during a collaboration session.

In one embodiment, there are multiple records such that each record 400 is associated with a particular participant device. Further, each device corresponds with multiple records wherein each record 400 for a particular device corresponds to a particular collaboration session.

In one embodiment, the record 400 includes a participant device identity field 410, a selected hidden window field 420, and a default settings field 430. In one embodiment, the record 400 resides within the storage module 330. In one embodiment, the record 400 describes attributes detected through the system 300.

In one embodiment, the participant device identity field 410 includes information related to the unique identity of the participant device. In one embodiment, a unique name of the user of the participant device is utilized within the participant device identity field 410. In another embodiment, a unique number identifier is utilized within the participant device identity field 410.

In one embodiment, the selected hidden window field 420 identifies which window(s) the device identified within the participant identification wishes to exclude from being seen by other participant devices within the collaboration session.

In one embodiment, the device designates the specific window(s) that are to be excluded from being viewed by other participant devices. For example, a chat window with a particular participant device may be identified and excluded from being viewed by other participant devices. Although the chat window may be included within the desktop of the presenter device, the chat window is marked as a hidden window and is excluded from view of the attendee device(s).

In another embodiment, the device designates a class of windows that are to be excluded from being viewed by other participant devices. For example, any chat windows visible at the presenter device may be identified and excluded from being viewed by other participants. In another example, any windows belonging to a particular application may be identified and excluded from being viewed by other participants. For example, windows that are related to Outlook ® can be identified and excluded from being viewed by other participants.

In one embodiment, the default settings field 430 includes predetermined settings that indicate types of windows that are to be identified and excluded from being viewed by other participants.

Figure 5:
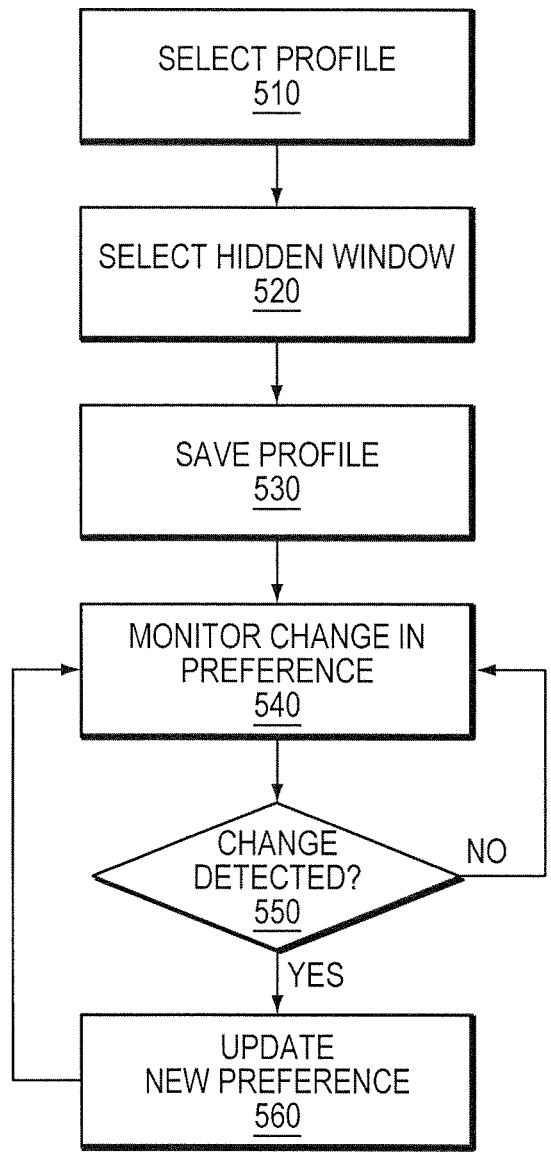
FIG. 5 is a flow diagram consistent with one embodiment of the methods and apparatuses for displaying and managing content during a collaboration session.
Figure 6:
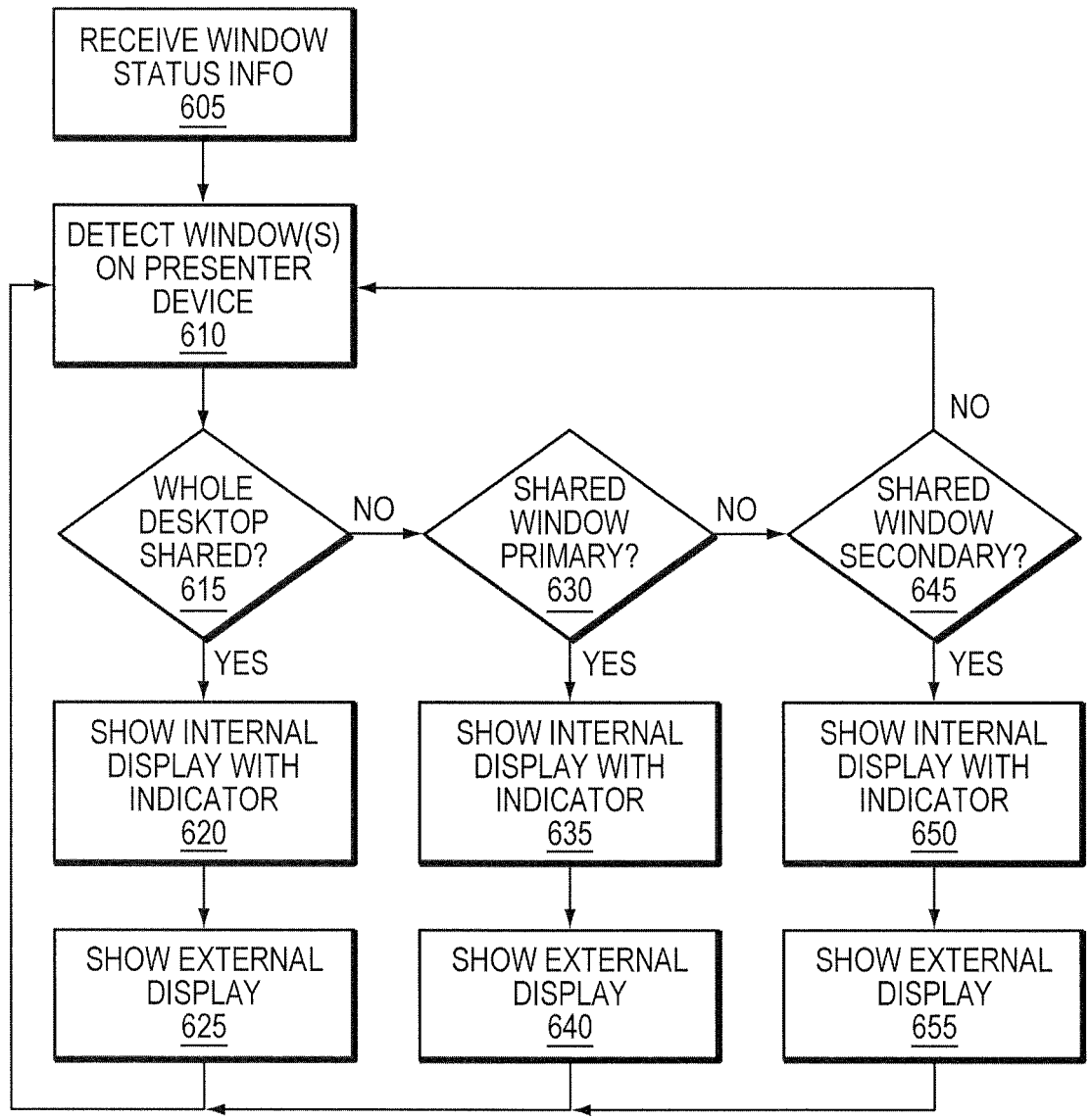
FIG. 6 is a flow diagram consistent with one embodiment of the methods and apparatuses for displaying and managing content during a collaboration session.

The flow diagrams as depicted in FIGS. 5 and 6 are one embodiment of the methods and apparatuses for displaying and managing content during a collaboration session. The blocks within the flow diagrams can be performed in a different sequence without departing from the spirit of the methods and apparatuses for displaying and managing content during a collaboration session. Further, blocks can be deleted, added, or combined without departing from the spirit of the methods and apparatuses for displaying and managing content during a collaboration session.

The flow diagram in FIG. 5 illustrates refining the profile of a user of the participant device for a collaboration session according to one embodiment of the invention.

In Block 510, the particular profile is selected by a user of a participant device. In one embodiment, the user's identity is authenticated by a user identification. In another embodiment, the user's identity is further confirmed by a log-in routine including but not limited to a password.

In Block 520, a hidden window is selected by the user in association with the particular profile. When a window is selected to be a hidden window, the content displayed within this window is configured to be shown to the user of the participant device associated with the particular profile and hidden from other participant devices.

For example, during a collaboration session attended by a first participant device and a second participant device, if a window is selected as hidden by a user utilizing a first participant device, then this hidden window could be viewed by the first participant device and hidden from a second participant device. Further, this hidden window stays hidden from the second participant device even when the first participant device is the presenter device and the second participant device is the attendee device during the collaboration session where the desktop of the first participant device is shared with the second participant device.

In one embodiment, the hidden window is selected by identifying a particular window such as a chat window between the first participant device and another party. For example, a participant device may identify chat windows that occur between the participant device and another particular party.

In another embodiment, the hidden window is selected by identifying windows associated with a particular application that the particular user wishes to exclude others from viewing. An exemplary class of windows includes all files associated with Outlook® including electronic messages, calendaring reminders, and the like.

In Block 530, the profile is stored which includes a window status that indicates whether the window is hidden or shared. In one embodiment, the profile is stored within a record such as the record 400 of FIG. 4.

In Block 540, the participant device is monitored for changing preferences of a hidden window. For example, if the user shares a window that is currently hidden, then the change is detected. Similarly, if the user makes a window hidden that is currently shared with other participant devices, then the change is also detected. In one embodiment, the changes to the window status are made in real time during the collaboration session.

If a change to the window status is detected in Block 550, then the new window status is updated in Block 560. In one embodiment, the window status is continually monitored in Block 540.

If a change to the window status is not detected in Block 550, then the window status is continually monitored in Block 540.

The flow diagram in FIG. 6 illustrates sharing a desktop from a presenter device to a participant device during collaboration session according to one embodiment of the invention.

In Block 605, window status information associated with a presenter device of a collaboration session is received. In one embodiment, the window status information describes whether a window is shared or hidden. In one embodiment, the window status information is stored within the record 400 in FIG. 4. In one embodiment, the window status information for each window within the desktop of the presenter device is received.

In Block 610, the windows currently displayed on the presenter device are detected. In one embodiment, various information regarding the window is detected such as applications associated with the window, title of the window, and the like.

In Block 615, if the entire desktop is shared, then an indicator is displayed within Block 620.

In Block 620, the internal display is shown to the presenter device with an indicator surrounding the desktop to indicate that the entire desktop is being shared. In one embodiment, the indicator is a color coded frame surrounding the desktop as viewed through the presenter device. In one embodiment, the internal render module 370 generates the internal display.

In Block 625, the external display is shown to attendee device(s). In this case with the desktop of the presenter device being shared, the external display includes the desktop of the presenter device. In one embodiment, the external render module 320 generates the external display.

In Block 615, if the entire desktop is not shared and a shared window is residing as a primary window in Block 630, then an indicator is displayed within Block 635. In one embodiment, the primary window is the top or dominant window among a plurality of windows within a desktop screen.

In Block 635, the internal display is shown to the presenter device with an indicator surrounding the primary window to indicate that the primary window is being shared. In one embodiment, the indicator is a color coded frame surrounding the primary window as viewed through the presenter device. In another embodiment, the indicator also includes a tab that allows the primary window that is currently being shared to terminate sharing the primary window with other attendee device(s). In one embodiment, the internal render module 370 generates the internal display.

In Block 640, the external display is shown to attendee device(s). In this case with the primary window of the presenter device being shared, the external display includes the primary window of the presenter device. In one embodiment, the external render module 320 generates the external display.

In Block 630, if a shared window is not residing as a primary window and the shared window is a secondary window in Block 645, then an indicator is displayed within Block 650. In one embodiment, the primary window is the top or dominant window among a plurality of windows within a desktop screen, and the secondary window resides below the top or dominant window.

In Block 650, the internal display is shown to the presenter device with an indicator surrounding the primary window to indicate that the primary window is not being shared. In one embodiment, the indicator is a color coded frame surrounding the primary window as viewed through the presenter device. In another embodiment, the indicator surrounding the primary window also includes a tab that allows the primary window to initiate sharing with other attendee device(s).

In another embodiment, a secondary window that is being shared also includes an indicator that signals that this secondary window is being shared with attendee device(s).

In one embodiment, the internal render module 370 generates the internal display.

In Block 655, the external display is shown to attendee device(s). In this case with the primary window of the presenter device not being shared and a secondary window being shared, the external display includes the secondary window of the presenter device. In one embodiment, the external render module 320 generates the external display.

Figure 7:
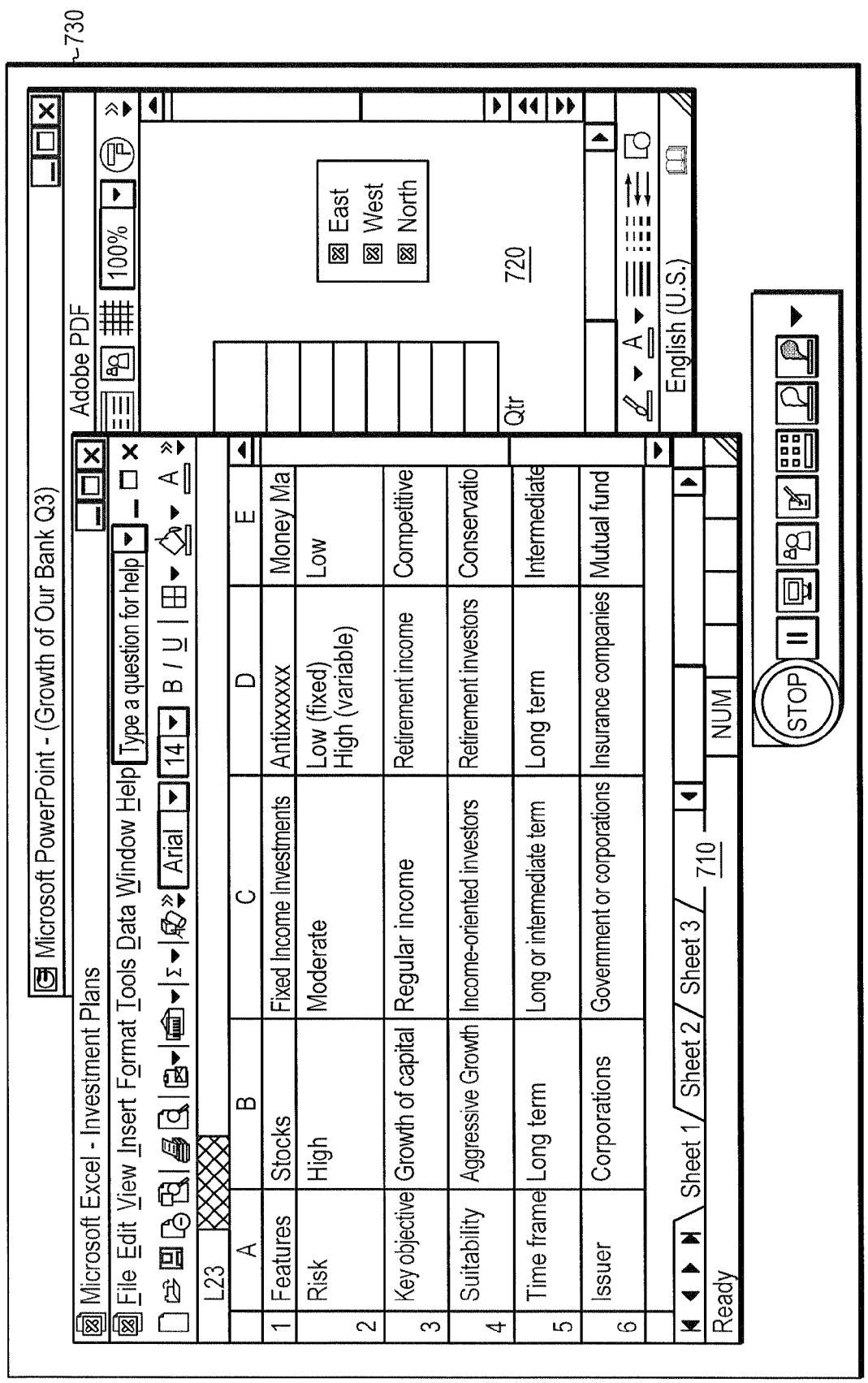
FIG. 7 is an exemplary screen shot consistent with one embodiment of the methods and apparatuses for displaying and managing content during a collaboration session.
Figure 8:
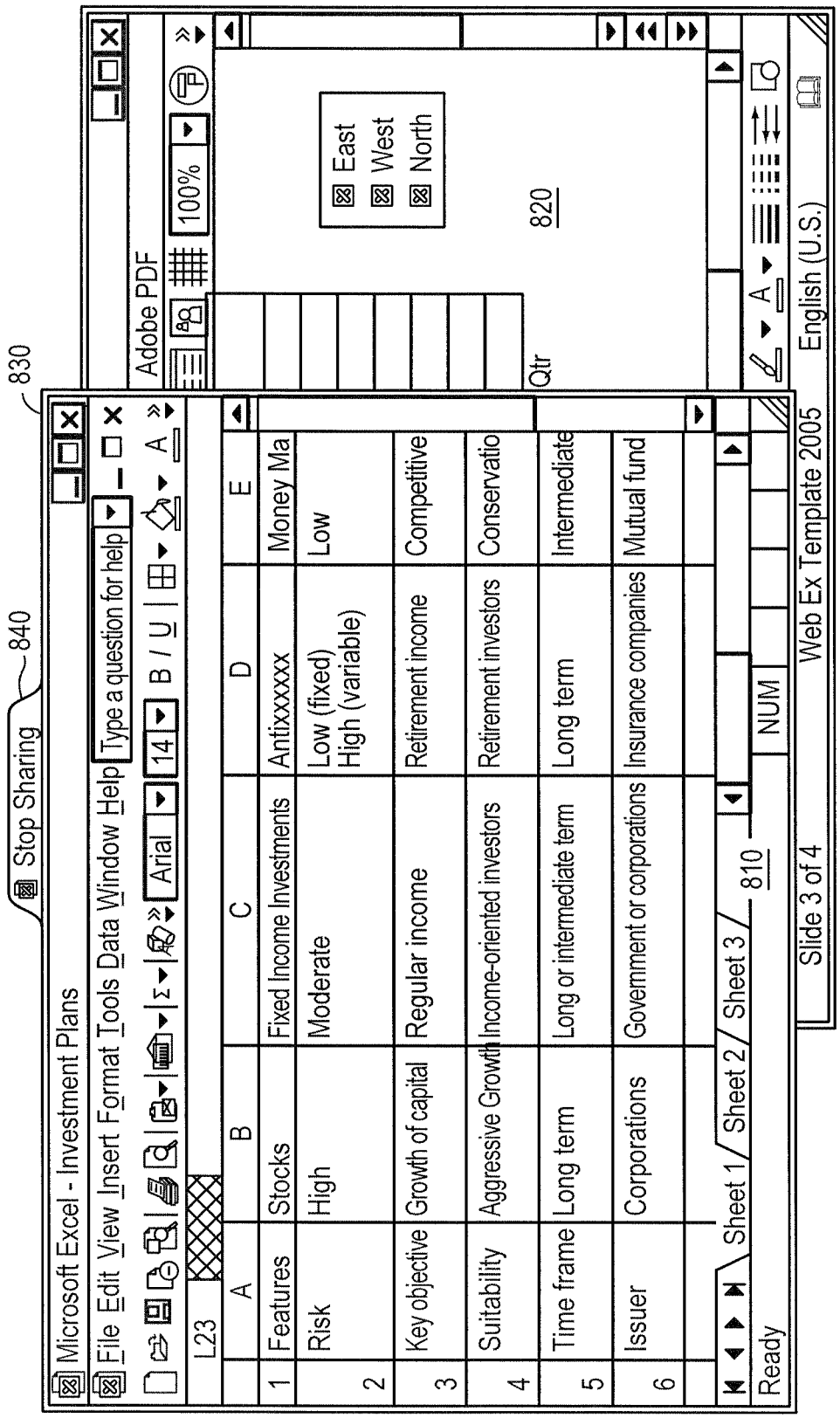
FIG. 8 is an exemplary screen shot consistent with one embodiment of the methods and apparatuses for displaying and managing content during a collaboration session.
Figure 9:
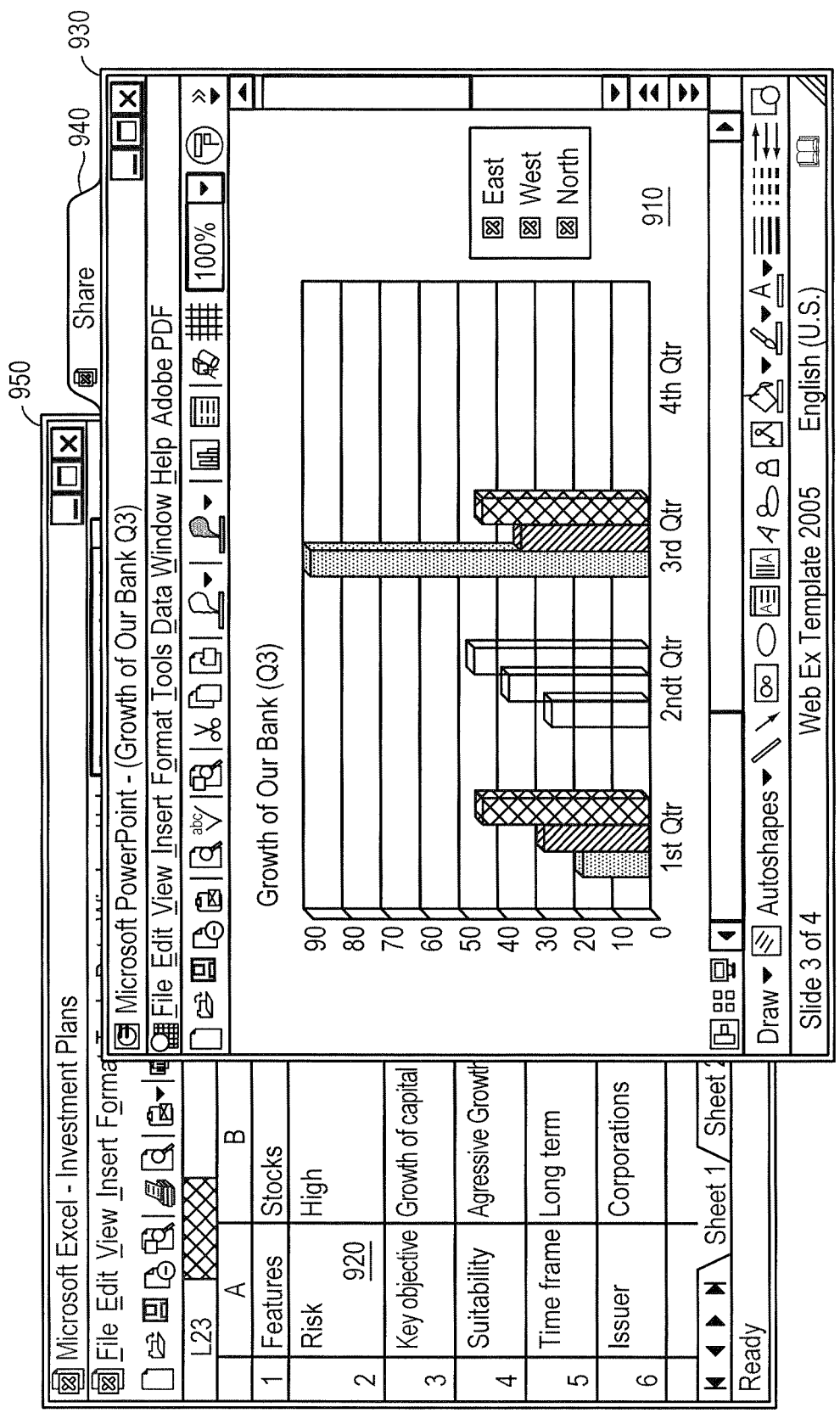
FIG. 9 is an exemplary screen shot consistent with one embodiment of the methods and apparatuses for displaying and managing content during a collaboration session.

Exemplary screen shots illustrating the desktops of a presenter device while participating in a collaboration session are shown in FIGS. 7, 8, and 9.

FIG. 7 illustrates a presenter desktop 700 that shows an exemplary desktop displayed by a presenter device. In one embodiment, the presenter desktop 700 includes a primary window 710 and a secondary window 720. In this example, both the primary window 710 and the secondary window 720 include content. An indicator 730 surrounds the presenter desktop 700 and represents that the desktop 700 is shared with other attendee device(s).

FIG. 8 illustrates a presenter desktop 800 that shows an exemplary desktop displayed by a presenter device. In one embodiment, the presenter desktop 800 includes a primary window 810 and a secondary window 820. In this example, both the primary window 810 and the secondary window 820 include content. An indicator 830 surrounds the primary window 810 and represents that the primary window 810 is shared with other attendee device(s). In one embodiment, the indicator 830 is color-coded to indicate that the primary window 810 is currently being shared with attendee device(s). Further, the primary window 810 also includes a tab 840 that allows a selection to be made which terminates sharing the primary window 810 with attendee device(s).

FIG. 9 illustrates a presenter desktop 900 that shows an exemplary desktop displayed by a presenter device. In one embodiment, the presenter desktop 900 includes a primary window 910 and a secondary window 920. In this example, both the primary window 910 and the secondary window 920 include content.

An indicator 930 surrounds the primary window 910 and represents that the primary window 910 is not shared with other attendee device(s). In one embodiment, the indicator 930 is color-coded to indicate that the primary window 910 is currently not being shared with attendee device(s). Further, the primary window 910 also includes a tab 940 that allows a selection to be made which initiates sharing the primary window 910 with attendee device(s).

An indicator 950 surrounds the primary window 910 and represents that the secondary window 920 is shared with other attendee device(s). In one embodiment, the indicator 950 is color-coded to indicate that the secondary window 920 is currently being shared with attendee device(s).

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A method comprising:
   displaying content generated by an application executing on a presenter device associated with a first user participating in a collaboration session in a window on a display of the presenter device in accordance with a window status assigned to the window, the window status being either a shared window status in which the corresponding window and its contents are rendered as displayable content on another device in the collaboration session or a hidden window status in which the corresponding window and its contents are excluded from being rendered as the displayable content on the other device;
   providing the displayable content from the presenter device to an attendee device associated with a second user participating in the collaboration session for display on a display of the attendee device during the collaboration session;
   indicating on the display of the presenter device the window status of the window by a graphical property of a frame that surrounds the window on the display of the presenter device;
   changing the window status of the window upon activation of a control on the frame that surrounds the window; and
   excluding the window from the displayable content in response to the window status thereof being changed to the hidden window status or including the window in the displayable content in response to the window status thereof being changed to the shared window status.

2. The method according to claim 1 wherein the property of the frame is a color code that distinguishes the shared window status from the hidden window status.

3. The method according to claim 1 further comprising:
   displaying unshared content on the display of the presenter device in another window separate from the primary window and having the hidden window status assigned thereto; and
   excluding the unshared content in the other window from the displayable content provided to the attendee device.

4. A method comprising:
displaying a primary window and a secondary window of one or more applications executing on a presenter device on a display of the presenter device, wherein each of the primary window and the secondary window is assigned a window status by the presenter device during a collaboration session, the window status being either a shared window status in which the corresponding window and its contents are rendered as displayable content on another device in the collaboration session or a hidden window status in which the corresponding window and its contents are excluded from being rendered as the displayable content on the other device;
displaying a control coupled to a frame that surrounds the primary window on the display of the presenter device, selection of the control by a user of the presenter device during the collaboration session causing a change in the window status of the primary window from the shared window status to the hidden window status or vice-versa;
selectively displaying the primary window or the secondary window on a display of an attendee device during the collaboration session based on the window status of the primary window and the secondary window assigned thereto by the presenter device.

5. The method according to claim 4 further comprising detecting a position of a first window and a second window to determine the primary window and the secondary window.

6. The method according to claim 4 further comprising indicating with a graphical property of the frame the window status of the primary window on the display of the presenter device such that the shared window status is distinguishable from the hidden window status.

7. The method according to claim 4 further comprising indicating with a graphical property of the frame the window status of the secondary window on the display of the presenter device such that the shared window status is distinguishable from the hidden window status.

8. A system, comprising:
a processor; and
a memory configured to store instructions executable by the processor to define a plurality of software modules, the software modules including:
  a window detection module configured to detect a window status of each of a plurality windows associated with one or more applications executing on the system, the window status defining each of the windows as a shared window or a hidden window;
  an internal render module configured to display the windows on a display of the system in accordance with corresponding window status, wherein the shared window is displayed with a frame that surrounds the shared window that distinguishes the shared window status from the hidden window status during the collaboration session, where the shared window and the hidden window are also each displayed with an attached control tab. selection of which switches the window status of the corresponding window during the collaboration session; and
  an external render module configured to provide the shared window and exclude the hidden window from the system to an attendee device during the collaboration session at which the shared window is displayed on a display of the attendee device during the collaboration session.

9. The system according to claim 8 further comprising a window selection module configured to identify the hidden window.

10. The system according to claim 8 further comprising an interface module configured to allow the attendee device to modify the window status of the windows through the control tab.

11. A method comprising:
establishing a collaboration session between a presenter device and one or more attendee devices;
displaying, on a display of the presenter device, a primary window of an application executing on the presenter device;
displaying, on the display of the presenter device, a frame surrounding the primary window of the application, wherein the frame indicates the primary window's shared window status during a collaboration session; and
displaying a control coupled to the frame that surrounds the primary window of the application, wherein the control is configured to, when activated, change a window status of the primary window from shared to hidden during the collaboration session and thus prevent of the primary window of the application on the presenter device from being rendered on a display of the one or more attendee devices.

12. The method according to claim 11 further comprising:
displaying, on the display of the presenter device, a secondary window; and
displaying a control associated with the secondary window, wherein the control is configured to, when activated, change the window status of the secondary window from hidden to shared during the collaboration session.

13. A method comprising:
detecting a plurality of windows on a desktop of a presenter device, each window associated with an application and displaying content related to that application;
determining whether the entire desktop of the presenter device is being shared with an attendee device in a collaboration session;
in response to the entire desktop of the presenter device being shared with the attendee device, displaying a frame that surrounds the entire desktop on the presenter device such that a graphical property of the frame indicates that the entire desktop is being shared;
in response to the entire desktop of the presenter device is not being shared with the attendee device, determining whether any of the windows are being shared with the attendee device in the collaboration session; and
in response to a window being shared with the attendee device, displaying a frame that surrounds the window on the presenter device such that a graphical property of the frame surrounding the primary window indicates that the window is being shared.

14. The method of claim 13 wherein the plurality of windows includes a secondary window located at least partially beneath a primary window on the desktop of the presenter device, and the method further comprises:
determining whether the secondary window is being shared with the attendee device in the collaboration session; and
in response to the secondary window being shared with the attendee device, displaying a frame that surrounds the secondary window on the presenter device such that a graphical property of the frame surrounding the secondary window indicates that the secondary window is being shared.

15. The method of claim 13, further comprising:
displaying a control on the frame that surrounds the window being shared with the attendee device, the control configured to, when activated, change a window status of the window from a shared window status to a hidden window status that excludes the window from being shared with the attendee device.

16. The method of claim 13, wherein the graphical property of the frame includes a color of the frame.

17. The method of claim 1 further comprising:
determining the window status of the window from a record retrieved from storage and displaying the window and its content in accordance with the retrieved window status; and
storing the changed window status of the window in the record upon the activation of the control on the frame.

18. A method comprising:
assigning a hidden window status to one or more windows that present content generated by corresponding processor-executable applications;
establishing a collaboration session between a plurality of devices, wherein one of the devices is configured as a presenter device and the remaining devices are each configured as an attendee device;
rendering the windows assigned the hidden window status and any other windows assigned a shared window status for display on the presenter device such that the windows assigned the shared window status are graphically distinguished from the windows assigned the hidden window status by a graphical indicator at each of the windows assigned the shared window status;
rendering the windows assigned the shared window status at the presenter device for display on the attendee device and excluding the windows assigned the hidden window status at the presenter device from the rendering of the windows for display on the attendee device; and
reassigning a selected window assigned the shared window status with the hidden window status by activating a control for the reassigning disposed on the selected window, wherein the control is disposed on all of the windows assigned the shared window status.

19. The method of claim 18 further comprising:
retrieving a record from a memory that indicates what windows are to be assigned the hidden window status; and
storing in the record an indication that the selected window is in the hidden window status upon activation of the control.

20. The method of claim 19, wherein assigning the hidden window status further comprises:
identifying a window type for which the windows are assigned the hidden window status;
storing the window type in the record; and
assigning the hidden window status to the windows of the window type displayed on the presenter device.

21. The method of claim 19, wherein assigning the hidden window status further comprises:
identifying a selected processor-executable application which the windows presenting the corresponding content are assigned the hidden window status;
storing an indication of the selected application in the record; and
assigning the hidden window status to the windows presenting the content of the selected application displayed on the presenter device.

\* \* \* \* \*